United States Patent [19]

Dunlap et al.

[11] Patent Number: 5,067,890
[45] Date of Patent: Nov. 26, 1991

[54] IN-MOLD LABEL SUPPLY SYSTEM FOR PLASTIC BLOW MOLDING MACHINE

[75] Inventors: Richard L. Dunlap, Cairo; Edward L. Sanford, Lima, both of Ohio

[73] Assignee: Plastipak Packaging, Inc., Plymouth, Mich.

[21] Appl. No.: 611,959

[22] Filed: Nov. 8, 1990

[51] Int. Cl.⁵ .............................................. B29C 49/24
[52] U.S. Cl. ................................ 425/504; 156/DIG. 31; 264/509; 271/12; 425/522
[58] Field of Search .................... 425/503, 504, 522; 264/509; 271/12; 156/DIG. 30, DIG. 31

[56] References Cited

U.S. PATENT DOCUMENTS

| | | | |
|---|---|---|---|
| 2,033,849 | 3/1936 | Mudd | 156/DIG. 31 |
| 3,287,198 | 11/1965 | Battenfield | 156/518 |
| 3,292,209 | 12/1966 | Borkmann | 425/126.1 |
| 3,324,508 | 5/1967 | Dickinson | 425/126.1 |
| 3,801,689 | 4/1974 | Langecker | 264/153 X |
| 4,029,537 | 6/1977 | Kish | 156/DIG. 31 |
| 4,355,967 | 10/1982 | Hellmer | 425/503 |
| 4,359,314 | 11/1982 | Hellmer | 425/503 |
| 4,397,625 | 8/1983 | Hellmer et al. | 264/509 X |
| 4,479,644 | 10/1984 | Bartimes et al. | 425/503 X |
| 4,479,770 | 10/1984 | Slat et al. | 425/503 |
| 4,479,771 | 10/1984 | Slat et al. | 264/509 X |
| 4,498,854 | 2/1985 | Ross | 425/522 X |
| 4,582,474 | 4/1986 | Ziegler | 425/522 X |
| 4,585,408 | 4/1986 | Darr | 425/504 X |
| 4,619,726 | 10/1986 | Cook et al. | 156/DIG. 31 |
| 4,636,166 | 1/1987 | Franks et al. | 425/503 |
| 4,637,600 | 1/1987 | Bartimes et al. | 264/509 X |
| 4,639,206 | 1/1987 | Darr | 425/503 |
| 4,639,207 | 1/1987 | Slat et al. | 425/503 |
| 4,680,000 | 7/1987 | Nowicki et al. | 425/504 X |
| 4,721,451 | 1/1988 | Darr | 425/503 |
| 4,737,099 | 4/1988 | Kaminski | 425/504 |

*Primary Examiner*—Richard L. Chiesa
*Attorney, Agent, or Firm*—Brooks & Kushman

[57] ABSTRACT

An in-mold label supply system (20) for a plastic blow molding machine (22) has particular utility for use with rotary wheel type blow molding and includes a hopper assembly (68) including a feed hopper (70) for positioning discrete sheet-like labels (72) in a vertical feed stack (74). A feeder (76) of the system includes a feed member (78) that selectively grips the lowermost label (72) of the feed stack (74) to provide delivery thereof to a conveyor (80) for conveyance to the blow molding machine (22) where a label dispenser (82) transfers the label (72) to a mold (24) of the machine for placement within a mold cavity section (28). A gate (104) of the feeder (76) cooperates with the feed member (78) to permit only the lowermost label (72) to be fed from the feed stack (74) to the conveyor (80). The feed member (78) is preferably embodied by a feed roller (114) to which pressurized gas and a vacuum are alternately fed to control the label feeding.

16 Claims, 6 Drawing Sheets

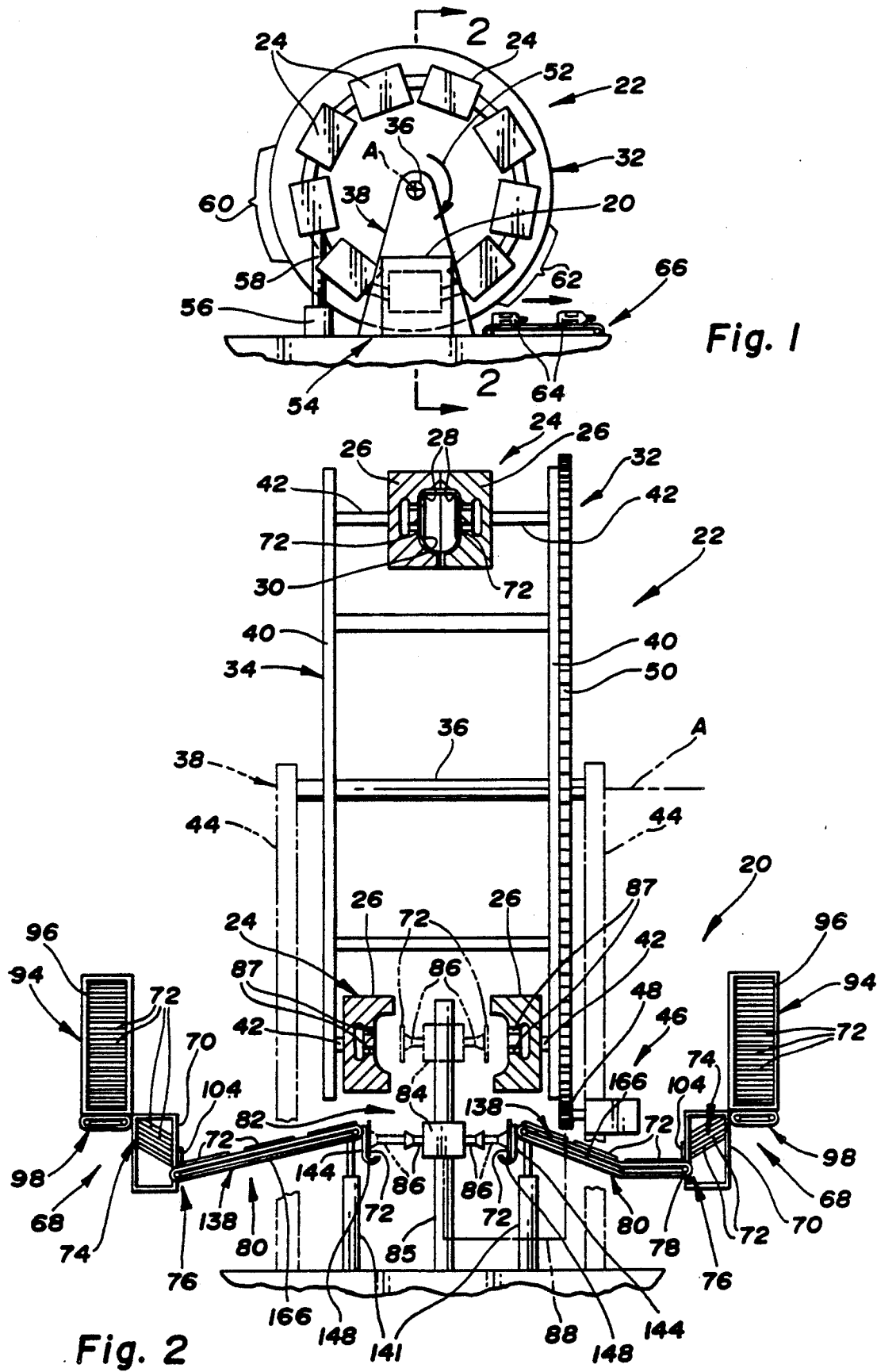

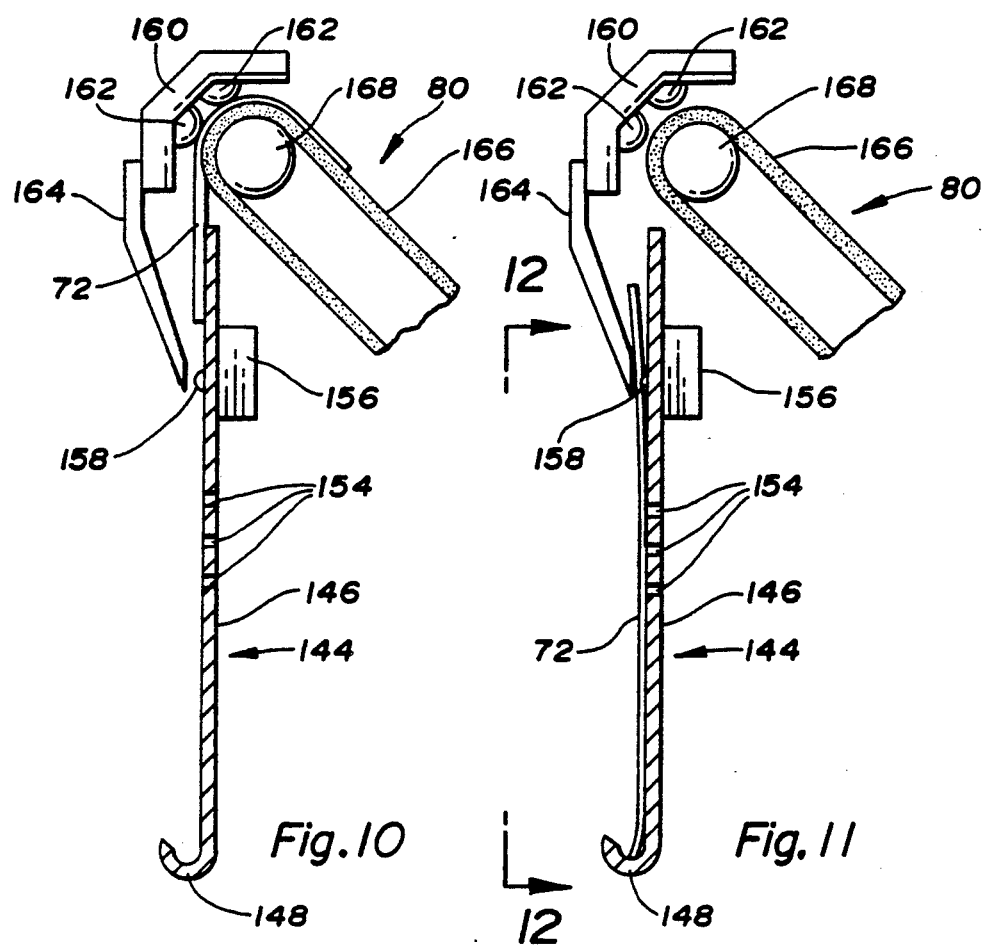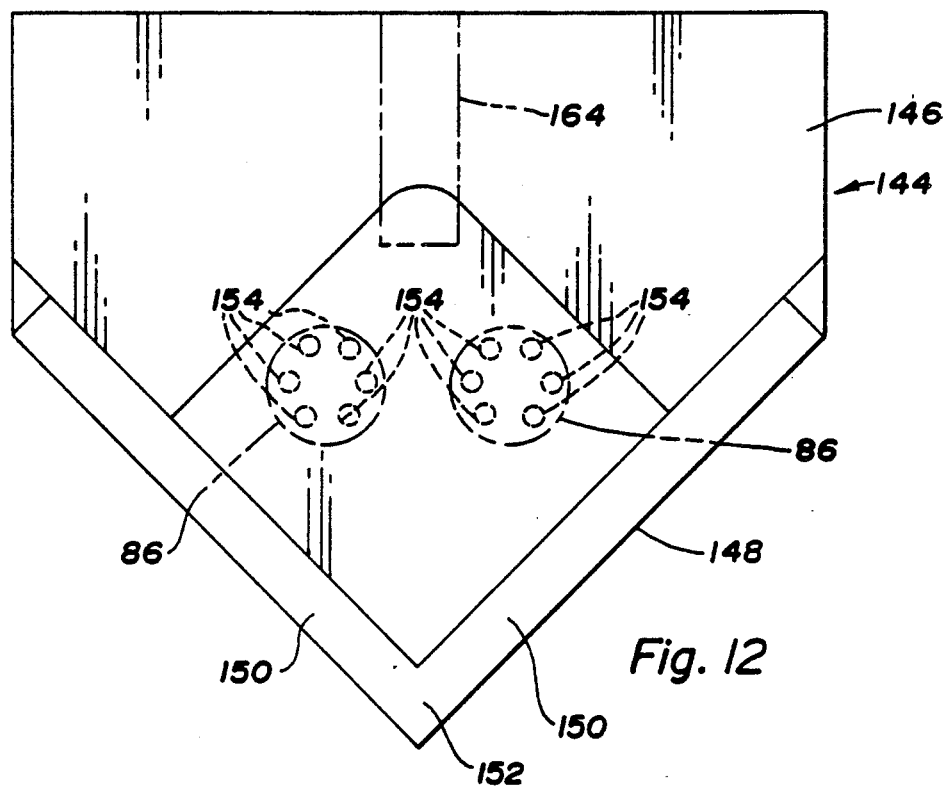

IN-MOLD LABEL SUPPLY SYSTEM FOR PLASTIC BLOW MOLDING MACHINE

TECHNICAL FIELD

This invention relates to an in-mold label supply system for a plastic blow molding machine to provide labels to molds of the machine prior to introduction of a hot plastic parison into each mold for expansion by blow molding as the label is bonded to the parison upon expanding to the shape of the mold cavity.

BACKGROUND ART

Blow molding machines conventionally provide a parison, i.e. a tube of hot plastic, between open sections of a mold. Closing of the mold then clamps the parison and allows air to be blow into the parison such that it assumes the shape of the mold. After suitable cooling has taken place, the mold sections are opened to allow ejection of the molded part.

Blow molded parts such as containers have conventionally included paper labels that are glued thereto after the molding to identify the contents of the container to the consumer. One problem is that such paper labels can become wrinkled if dampened and can also become detached from the container if a waterproof glue is not used. Also, paper labels require a separate labeling step after the molding which thus adds to the cost of the container.

In-mold labeling has been developed in the recent past to provide superior bonding of labels to blow molded plastic parts. This in-mold labeling is performed by initially inserting a label within the mold prior to the introduction of the parison and by then closing sections of the mold in preparation for the blowing operation. The subsequent blowing operation forms the parison around the label to the shape of the mold and provides a permanent bond which is incapable of being broken by moisture or otherwise. Also, such inmold labeling provides a smooth transition between the label and the adjacent surface of the molded plastic part and further provides additional strength since the label cooperates with the plastic in resisting deformation. Such strengthening also allows the use of less plastic to blow mold the part and thereby reduces the ultimate cost to the consumer. Furthermore, when utilized with containers for carbonated or other beverages, it is believed that in-mold labeling reduces the flow of carbon dioxide and other fluids through the container wall over a period of time and thereby increases the shelf life.

Prior in-mold label dispensers for blow molding machines conventionally include a label carrier having a vacuum cup that receives a label from a label magazine and is then moved to deposit the label within the mold cavity whereupon termination of a vacuum drawn at the vacuum cup allows a vacuum drawn at the mold cavity to secure the label in position in preparation for the blow molding. Such vacuum type label carriers have previously been mounted on linkages that move the labels along an angular path with respect to the direction of opening and closing movement of mold sections of the mold in order to permit depositing of the labels in the confined space permitted by the extent of the mold opening.

Another prior art type of in-mold label dispenser is disclosed by Hellmer U.S. Pat. Nos. 4,355,967 and 4,359,314 and includes a vacuum type label carrier that is moved along an abruptly curved path by a complex linkage which executes a 180 degree turn in order to transfer labels from a label magazine to the mold in preparation for molding.

Hellmer U.S. Pat. No. 4,397,625 and Boss U.S. Pat. No. 4,498,854 disclose in-mold label dispensers wherein fluid motors move vacuum type label carriers to transfer labels from label stacks to associated molds.

Slat et al U.S. Pat. Nos. 4,479,770, 4,479,771 and 4,639,207 disclose in-mold label dispensers wherein a first solid mechanical drive moves a dispensing head between inserted and withdrawn positions with respect to an open mold and wherein a second solid mechanical drive extends and retracts vacuum type carriers in order to transfer labels from a label magazine to a mold to perform the labeling operation. Use of such solid mechanical drives to move the dispensing head and the label carriers permits accurate positioning of the labels. Also, the in-mold label dispenser of the mentioned U.S. Pat. No. 4,479,771 patent provides labels to a plurality of vacuum type label carriers with a single label magazine. This is accomplished by mounting the label carriers on a dispensing head which is moved past the label magazine and paused upon alignment of each label carrier with the label magazine to permit the supply of a label to the label carrier such that all of the label carriers receive labels prior to movement of the dispensing head to an inserted position between open mold sections to transfer the labels to the mold.

Bartimes et al U.S. Pat. No. 4,479,644 discloses another type of in-mold label dispenser for use with a plastic blow molding machine wherein vacuum label carriers transfer labels from label magazines to a mold.

Ziegler U.S. Pat. No. 4,582,474 discloses an in-mold label dispenser with different embodiments capable of transferring labels from label magazines to single, dual, and three cavity molds. In certain applications, multiple cavity molds are desirable to increase production from the blow molding machine while still maintaining the same cycle time such that quality can be maintained. The in-mold label dispenser that provides labeling of single, dual, and three cavity machines in accordance with U.S. Pat. No. 4,582,474 has a carrier arm with a first end pivotally supported on a base of the dispenser for movement about a pivotal axis to move a dispensing head with a vacuum label carrier on a second end of the carrier arm along a curved path between a withdrawn position adjacent a label magazine and an inserted position between mold portions to which one or more labels is transferred. A drive mechanism of the dispenser includes a first drive that pivotally moves the carrier arm between the withdrawn and inserted positions and also includes a second drive that moves the label carrier on the dispensing head between retracted and extended positions during cyclical operation that provides the in-mold labeling.

Darr U.S. Pat. Nos. 4,585,408, 4,639,206 and 4,721,451 disclose in-mold label dispensers for plastic blow molding wherein a dispensing head with vacuum label carriers thereon is moved with rectilinear motion between a withdrawn position adjacent label magazines and an inserted position between open mold portions, and the dispensing head is also moved transverse to the direction of the rectilinear motion between an aligned position with respect to the open mold and a label transfer position to provide the inmold labeling. The in-mold label dispenser of U.S. Pat. No. 4,585,408 has an elongated support that mounts the dispensing head for the rectilinear movement and is itself mounted about a pivotal axis to support the dispensing head for pivotal movement between the aligned and label transfer positions. In the in-mold label dispenser of U.S. Pat. No. 4,639,206, a pair of locators mounted by base portions on opposite sides of the mold are engaged with each other as the dispensing head is moved to its inserted position to thereby provide support in locating the dispensing head prior to arcuate movement to the label transfer position for dispensing of labels. With both of these dispensers, arcuate movement of the dispensing head between its mold aligned and label transfer positions does not permit labeling of certain mold constructions since the degree to which the dispensing head can move arcuately is limited by the mold construction and the construction of cavity sections within the mold. In the in-mold label dispenser of U.S. Pat. No. 4,721,451, the dispensing head is moved rectilinearly between the aligned and label transfer positions in a transverse direction to the rectilinear movement between the withdrawn and inserted positions.

All of the in-mold label dispensing systems disclosed by the above mentioned patents transfer discrete sheet-like labels on one or more vacuum carriers from one or more label magazines to the mold in which the blow molding is performed with the in-mold labeling. On occasion, the vacuum carrier can pull more than one label from the magazine since the labels tend to adhere to each other to a certain extent. Spring fingers of the label magazines are designed to prevent more than one label from being transferred during each cycle, but occasionally more than one label can nevertheless be pulled from the magazine by the vacuum carrier due to the adherence of the labels to each other. This can result in a second label being placed within the mold out of the intended position as well as the one label at the correct position. Furthermore, when one label is applied to each mold portion of a mold so as to provide labels on the opposite sides of the blow molded product, malfunctioning of the dispenser mechanism associated with one mold portion can result in the blow molded product being molded with only one label rather than the required two labels. Such mislabeled products must be heated to remove the misapplied label since regrinding of the product for scrap with a label adhered thereto will produce reground resin that results in holes in the subsequently blow molded products due to the presence of the label material. However, it is nevertheless necessary to perform the label removal since government regulations, the cost of solid waste disposal of relatively bulky blow molded products, and the cost of resin will not permit economical manufacturing if the labels are not removed and the waste product reground for recycling.

In-mold labeling has also previously been performed with labels that are supplied in strips that are conveyed to the mold for the in-mold labeling such as disclosed by U.S. Patents: Battenfeld et al U.S. Pat. No. 3,287,198; Borkmann U.S. Pat. No. 3,292,209; Dickinson U.S. Pat. No. 3,324,508; and Langecker U.S. Pat. No. 3,801,689. While such strip type labels can eliminate certain problems involved with in-mold labeling, there is label scrap involved which is not economical and the molds utilized must be specially adapted to permit the label strips to be moved into position for transferring a label portion of the strip to the mold for the in-mold labeling.

DISCLOSURE OF INVENTION

An object of the present invention is to provide an improved in-mold label supply system for a plastic blow molding machine to overcome problems associated with prior label transferring in in-mold labeling operations.

In carrying out the above and other objects of the invention, the in-mold label supply system is designed for use with a plastic blow molding machine including at least one mold having a pair of mold portions which have associated cavity sections and are movable toward and away from each other between an open position where the mold portions are spaced from each other and a closed position where the cavity sections define an enclosed cavity in which the blow molding is performed.

The in-mold label supply system of the invention includes a hopper assembly having a feed hopper for positioning discrete sheet-like labels in a vertical stack. A feeder of the system includes a feed member that selectively grips the lowermost label of the feed stack to provide delivery thereof from the feed stack with the next higher label remaining in the feed stack. A conveyor of the system conveys the label from the feed member to the blow molding machine, while a label dispenser transfers the label from the conveyor to the mold for placement within the cavity section of one mold section with the mold portions in the open position to provide in-mold labeling prior to closing of the mold sections for blow molding that secures the label to the blow molded product.

In the preferred construction, the in-mold label supply system also includes a pressurized gas supply that supplies pressurized gas to the feed stack of labels to facilitate the gripping of the lowermost label by the feed member for the delivery from the feed stack with the next higher label remaining in the feed stack.

Preferably, the hopper assembly of the in-mold label supply system also includes a storage hopper for storing a supply of the discrete sheet-like labels in a vertical storage stack. A transfer device of the hopper assembly transfers labels from the bottom of the vertical storage stack to the top of the feed stack to maintain the feed stack with a height of labels that can be maintained separated by the supply of pressurized gas to facilitate gripping of the lowermost label by the feed member. This transfer device is preferably embodied by an endless belt that moves the labels from the bottom of the storage stack to the top of the feed stack.

In its preferred construction, the feeder of the in-mold label supply system includes a gate that is spaced above the feed member a distance just greater than the label thickness so as to permit only the lowermost label to be moved from the feed stack by the feed member. An adjuster of the feeder adjusts the spacing between the gate and the feed member to accommodate labels of different thicknesses. A source of vacuum of the system draws a vacuum at the feed member to provide gripping of the lowermost label of the feed stack by the feed member for movement of the gripped label under the gate to the conveyor. The feed member of the feeder is preferably constructed as a feed roller that rotates to grip and move the lowermost label of the feed stack under the gate to the conveyor. Operation of the system is enhanced by provision of: a pressurized gas supply, a source of vacuum, and valve means for selectively and alternately communicating the feed roller with: (a) the pressurized gas supply which prevents the lowermost label of the feed stack from passing under the gate; or (b) a source of vacuum which grips the lowermost label of the feed stack to actuate movement thereof under the stack by rotation of the feed roller. A sensor of the system senses the movement of the label under the gate to control operation of the valve means.

In the preferred construction of the in-mold label supply system, the conveyor includes a conveying reach that extends horizontally and the system also includes a transfer member to which the label is conveyed for transfer by the label dispenser to the mold of the blow molding machine. This transfer member preferably comprises a vertically extending plate having a lower catcher that receives and positions the lower extremity of the label. Best results are achieved when the lower catcher includes a pair of inclined portions having a corner junction with each other. Furthermore, the transfer member is preferably perforated to facilitate transferring of the label by the label dispenser to the mold. A sensor of the system senses whether a label is positioned on the transfer member to thereby terminate the associated machine operation if the label supply mechanism malfunctions. Such termination is particularly advantageous when two labels are to be supplied to each mold to limit the number of blow molded products manufactured under malfunctioning with only one label and thereby reduce the amount of work involved with removing container labels in preparation for re-grinding of scrap.

The in-mold label supply system has particular utility when utilized with a blow molding machine of the wheel type and is specifically designed to provide labels thereto with the conveyor extending horizontally and preferably delivering the labels to the label dispenser at a lower location with respect to the rotating wheel. In the preferred construction disclosed, labels are supplied from each side of the wheel by an associated hopper assembly, feeder and conveyor to a common label dispenser that transfers the labels to both mold portions for labeling of both sides of the blow molded product.

The objects, features and advantages of the present invention will be readily apparent from the following detailed description of the best mode for carrying out the invention when taken in connection with the accompanying drawings.

BRIEF DESCRIPTION OF DRAWINGS

FIG. 1 is a schematic side elevational view of a plastic blow molding machine having a labeling station which includes an in-mold label supply system constructed in accordance with the present invention;

FIG. 2 is an elevational view taken partially in section along the direction of line 2—2 in FIG. 1 to illustrate the in-mold label supply system;

FIG. 10 is an enlarged partial view of the conveyor taken along line 10—10 in FIG. 9 and illustrates a label partially transferred from the conveyor to a transfer member in preparation for transferring of the label to the blow molding machine;

FIG. 11 is a view similar to FIG. 10 but illustrating the label fully received by the transfer member; and FIG. 12 is an elevational view taken along the direction of line 12—12 in FIG. 11 to further illustrate the label as received by the transfer member in preparation for the transfer to the blow molding machine.

BEST MODE FOR CARRYING OUT THE INVENTION

Figure 3:
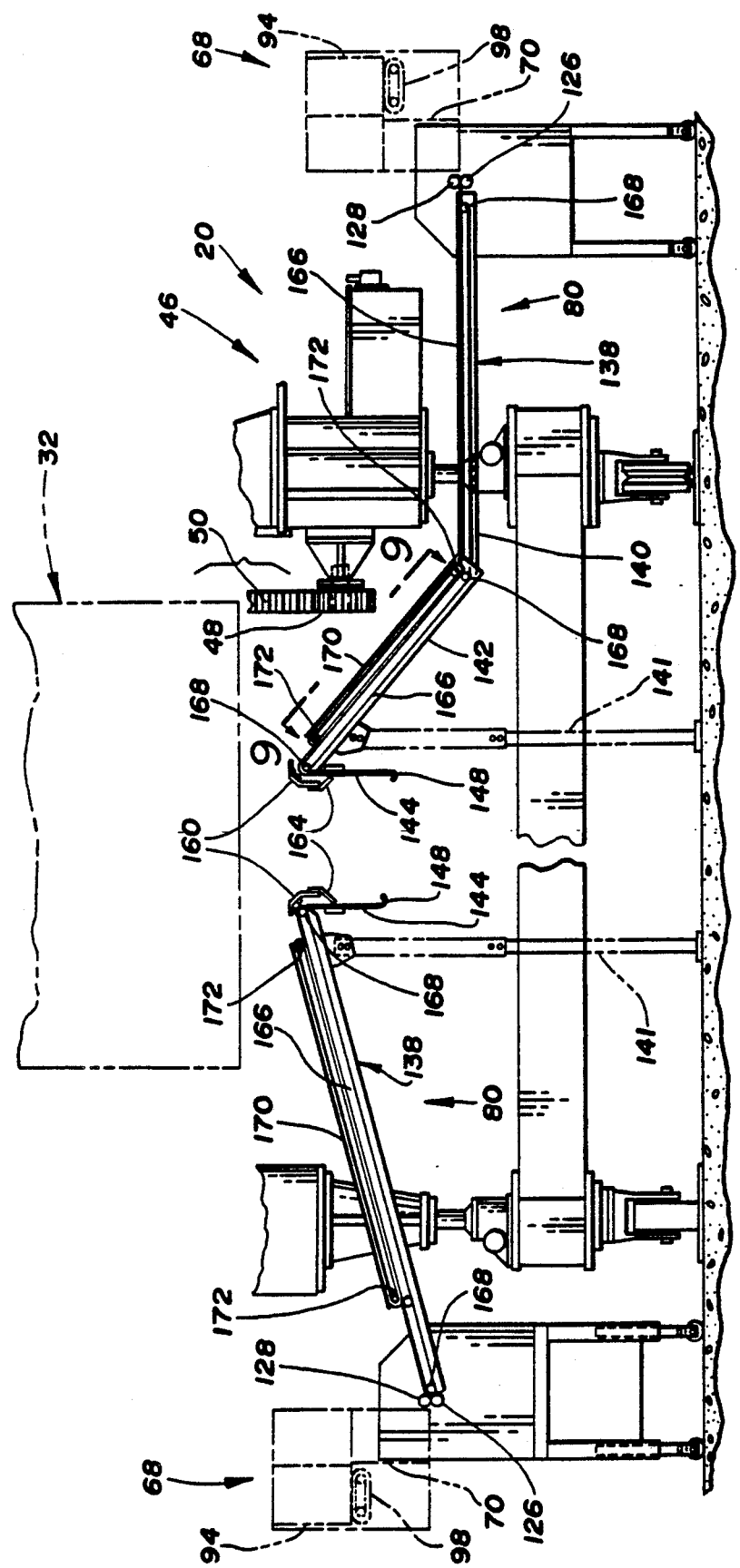
FIG. 3 is an enlarged partial view taken in the same direction as FIG. 2 to further illustrate the in-mold label supply system.

Referring to FIGS. 1 and 2 of the drawings, an in-mold label supply system constructed in accordance with the invention is indicated generally by 20 and is utilized with a plastic blow molding machine 22 to supply discrete sheet-like labels thereto for in-mold labeling as is hereinafter more fully described. The plastic blow molding machine 22 includes at least one mold 24 having a pair of mold portions 26 which have associated cavity sections 28 as shown in FIG. 2. The mold portions 26 are movable toward and away from each other between the open position shown at the lower portion of FIG. 2 and the closed position illustrated at the upper portion of FIG. 2 where the cavity sections 28 define an enclosed cavity 30 in which the blow molding is performed. As illustrated, the plastic blow molding machine 22 is of the wheel type including a rotary wheel 32 that supports a plurality of the molds 24, which is a construction for which the label supply system 20 has particular utility. However, the label supply system 20 can also be utilized with a plastic blow molding machine including a single mold whose mold portions define one or more cavities upon movement from the open position to the closed position with one or more parisons of either the extruded or blow molded type received thereby in preparation for conventional blow molding.

As illustrated in FIGS. 1 and 2, the rotary wheel machine 22 has its rotary wheel 32 provided with a wheel frame 34 supported by a shaft 36 about an axis A on a stationary frame 38. The wheel frame 34 includes wheel frame portions 40 that are spaced axially along the rotary axis A as shown in FIG. 2 with the molds 24 located axially intermediate these wheel frame portions. Slide rods 42 extend between the wheel frame portions 40 parallel to the rotary axis A and support the mold portions 26 for movement between the open and closed positions under the operation of suitable unshown actuators in a conventional fashion. The stationary frame 38 has axially spaced stationary frame portions 44 between which the rotary wheel 32 is located and supported for rotation by the shaft 36 which also extends between the stationary frame portions. At the right axial side of the rotary blow molding machine as illustrated in FIG. 2, a drive mechanism 46 of the machine has a gear output 48 that meshes with and drives a bull or drive gear 50 of the adjacent wheel frame portion 40 of the rotary wheel 32. Such driving is in a clockwise direction as shown by the arrow 52 in FIG. 1.

As illustrated in FIG. 1, the plastic blow molding machine 22 has a label applying station 54 at which the label supply system 20 introduces discrete sheet-like labels into the open mold as is hereinafter described. Clockwise from the label station 54, the blow molding machine 22 includes an extruder 56 that supplies an upwardly extruded hot plastic parison 58 between the open molds whose mold sections 26 are subsequently closed at a mold closing station 60 where pressurized gas is supplied to the interior of the parison within the mold cavity to perform the blow molding in a conventional manner with the labels secured to the blow molded product by the in-mold labeling. The blow molded product cools within the mold during continual clockwise rotation of the rotary wheel 32 as the associated mold 24 moves to an opening station 62 where its mold portions 26 open to permit ejection of the blow molded product 64 and conveyance thereof on a delivery conveyor 66.

As illustrated somewhat schematically in FIG. 2, the in-mold label supply system includes a hopper assembly 68 including a feed hopper 70 having a slightly inclined floor 71 (FIG. 4) for positioning discrete sheet-like labels 72 in a vertical feed stack 74. This feed hopper 70 also has side walls 75 (FIG. 4) that cooperate with the floor 71 to position the label feed stack 74. A feeder 76 of the label supply system 20 includes a feed member 78 that grips the lowermost label 72 of the feed stack 74 through an opening 79 in the floor 71 of the feed hopper 70 to provide delivery thereof from the feed stack with the next higher label remaining in the feed stack. A conveyor 80 of the label supply system 20 conveys the label from the feed member 78 to the blow molding machine 22. The label supply system 20 also includes a label dispenser 82 that transfers the label 72 from the conveyor 80 to the mold 24 for placement within the cavity section 28 of one of the mold portions 26 with the mold portions in the open position shown by the lower extremity of FIG. 2 to thereby provide in-mold labeling prior to closing of the mold portions for blow molding that secures the label to the blow molded product.

As illustrated in FIG. 2, the in-mold label supply system 20 includes a hopper assembly 68, a feeder 76, and a conveyor 80 associated with each side of the rotary wheel 22 so as to provide a pair of labels 72 to the label dispenser 82 which transfers the labels 72 to both mold sections 26 of each mold 24 in order to provide labels on opposite sides of the blow molded product. The label dispenser 82 is of the type disclosed by Slat et al U.S. Pat. Nos. 4,479,770 and 4,639,207 wherein a dispensing head 84 is movable on a stationary support 85 between a solid line indicated withdrawn position and a phantom line indicated inserted position between the open mold portions 26 of the mold 24 at the label station. A pair of label carriers 86 are mounted on the dispensing head 84 for movement between a retracted position and an extended label transfer position in coordination with the movement of the dispensing head 84 between the withdrawn and inserted positions.

During each cycle of operation, the label dispenser 82 shown in FIG. 2 initially has its dispensing head 84 located in the solid line indicated withdrawn position where the label carriers 86 are first moved outwardly from the retracted position to the extended position to receive labels from the label supply system and are then moved back to the retracted position with the labels secured thereto by a vacuum supplied through each label carrier. Movement of the dispensing head 84 of the dispenser from the withdrawn position to the inserted position between the open mold portions 26 and outward movement of the label carriers 86 from the retracted position to the extended position then positions each label 72 within the cavity section 28 of the adjacent mold portion 26, and a vacuum drawn through vacuum ports 87 of the mold portions upon termination of the vacuum at each label carrier 86 transfers each label 72 to the mold 24 to complete the in-mold labeling in preparation for the blow molding as previously described upon continued rotation to the closing station. Thereafter, the label carriers 86 are moved back to the retracted position and the dispensing head 84 is moved from the inserted position back to the withdrawn position in preparation for the next cycle. It should be noted that a mechanical connection 88 driven by the output 48 that also drives the bull or drive gear 50 of the blow molding wheel 32 is connected to the dispensing head 84 and label carriers 86 as disclosed by the previously mentioned Slat et al U.S. Pat. Nos. 4,479,770 and 4,639,207 patents to coordinate the rotation of the rotary wheel 32 and the label dispenser 82 to ensure accurate label registration with each mold.

Figure 4:
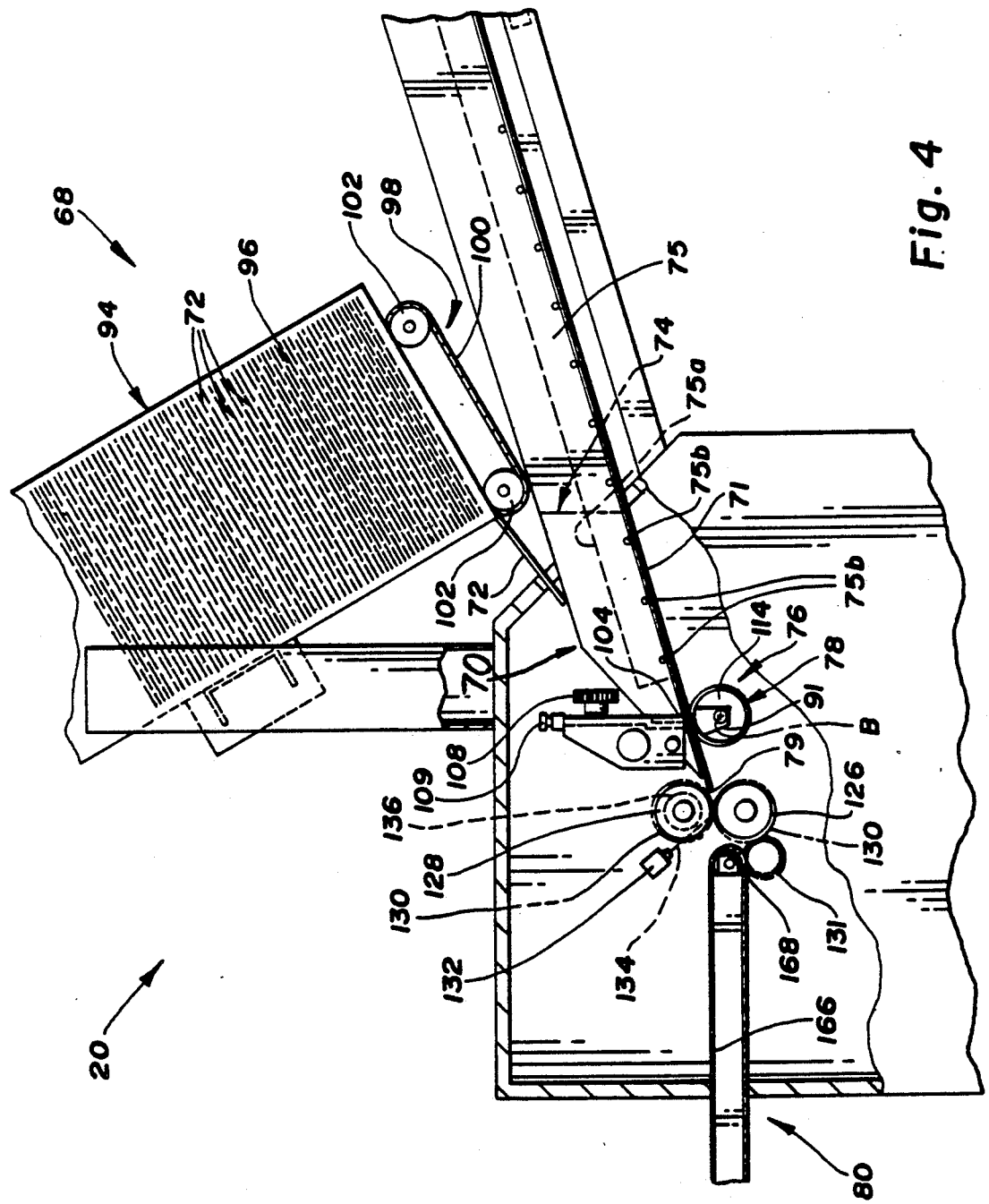
FIG. 4 is a partial view taken on an enlarged scale in the same direction as FIGS. 2 and 3 to further illustrate a hopper assembly, a feeder and a conveyor of the in-mold label supply system.
Figure 5:
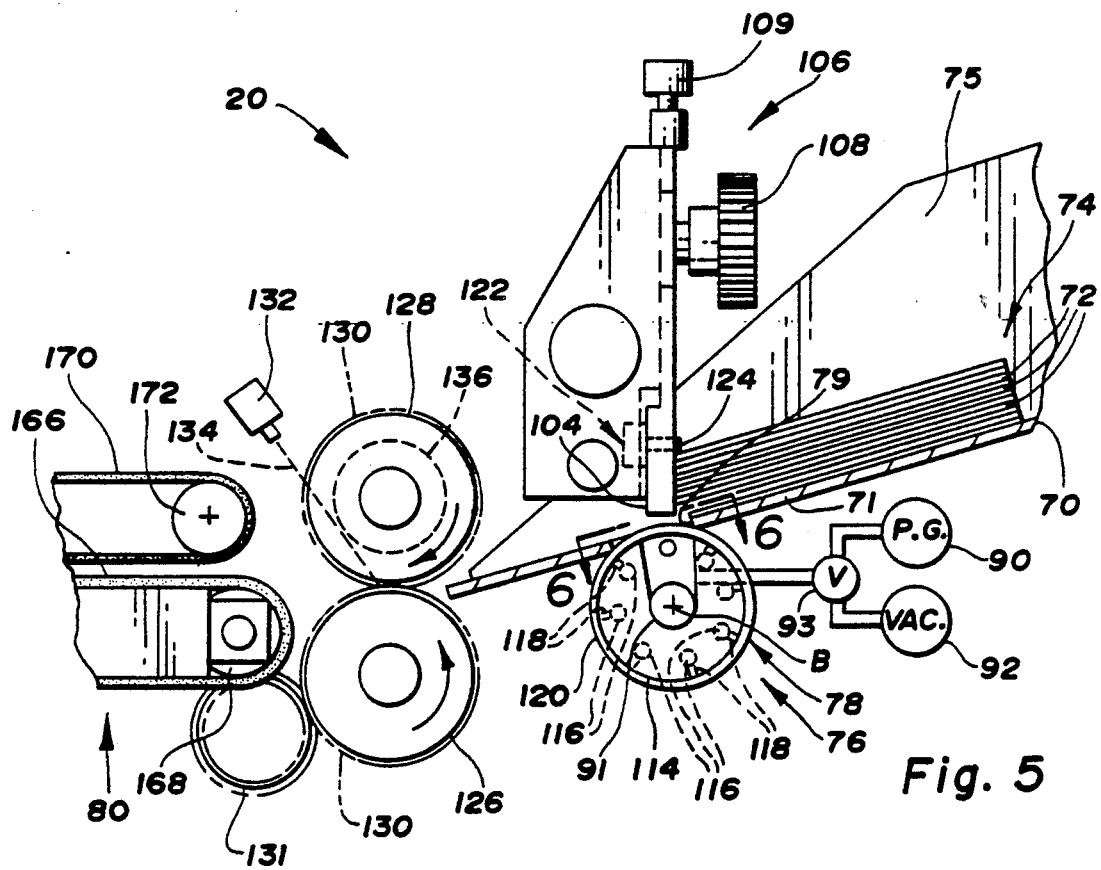
FIG. 5 is an enlarged view of a portion of the hopper assembly and the feeder as well as a portion of the conveyor of the in-mold label supply system.

As best illustrated in FIG. 5, the in-mold label supply system 20 also includes a pressurized gas supply 90 that supplies pressurized gas to the feed stack 74 of labels 72 to facilitate the gripping of the lowermost label by the feed member 78 for the delivery from the feed stack with the next higher label remaining in the feed stack. This pressurized gas is illustrated as being supplied through a manifold 91 to the feed member 78 from which it is supplied to the feed stack 74 of label 72. A vacuum is also supplied from a source 92 to the feed member 78 through the manifold 91 to facilitate gripping of the lowermost label 72 by the feed member 78. A valve 93 provides a means that selectively and alternately communicates either the pressurized gas supply 90 or the vacuum source 92 with the manifold 91 and hence with the feed member 78 that transfers the lowermost label 72 during each cycle of operation. The pressurized gas is also supplied continuously from the pressurized gas supply 90 to manifolds 75a (FIG. 4) of the feed hopper side walls 75 through holes 75b thereof to the feed stack 74 of label 72 to separate the labels from each other and thereby facilitate the movement of only a single label by the feed member 78 during delivery of the label to the conveyor 80.

As shown best in FIG. 4, the in-mold label supply system 20 also preferably has its hopper assembly 68 provided with a storage hopper 94 for storing a supply of the discrete sheet-like labels 72 in a vertical storage stack 96. The hopper assembly 68 also includes a transfer device 98 that transfers labels 72 from the bottom of the vertical storage stack 96 to the top of the feed stack 74 to maintain the feed stack with a height of labels that can be maintained separated by the supply of pressurized gas to facilitate gripping of only the single lowermost label 72 by the feed member 78. This transfer device 98 is illustrated as being embodied by an endless belt 100 that is trained over two wheels 102 with one of the wheels being rotatively driven so as to move the belt in a counterclockwise direction such that its upper reach between the wheels engages a partially open portion of the lower side of the storage stack 94 so as to provide the label transfer to the feed stack 74 from the storage stack 96. It should also be noted that the feed hopper 70 and storage hopper 94 respectively orient the vertical feed and storage label stacks 74 and 96 at slight inclinations which facilitates the label movement from the storage stack to the feed stack and from the feed stack to conveyor 80.

Figure 7:
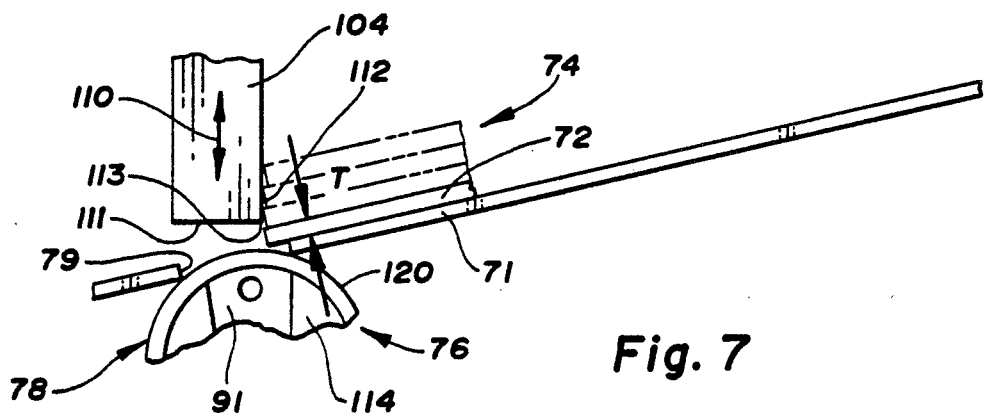
FIG. 7 is a partial view taken in the same direction as FIG. 6 and further illustrates the feeder which includes a gate that controls feeding of the labels.

As best illustrated by combined reference to FIGS. 5 and 7, the label feeder 76 includes a gate 104 that is located adjacent the floor opening 79 and spaced above the feed member 78 a distance T (FIG. 7) just greater than the label thickness so as to permit only the lowermost label 72 to be moved from the feed stack 74 by the feed member 78 with each next higher label being blocked by the gate. An adjuster 106 illustrated in FIG. 5 includes a lock 108 for locking the vertical position of the gate 104 and also includes an adjusting member 109 that is operable to move the gate 104 vertically. The lock 108 is thus unlocked to permit the vertical movement actuated by the adjusting member 109 so as to move the gate 104 vertically as shown by arrow 110 in FIG. 7. After adjustment of the gate 104 to the appropriate vertical position, the lock 108 is again locked to maintain the gate in that position until labels of a different thickness are used. The source of vacuum 92 shown in FIG. 5 pulls the lowermost label 72 downwardly so as to pass below the gate 104 after termination of the pressurized gas through the operation of the valve 93 that provides the communication through the manifold 91 with the feed member 78. The gate 104 as shown in FIG. 7 has a bottom surface 111 and a blocking surface 112 that define an edge 113 that is spaced from the feed roller to only allow the lowermost label 72 to pass under the gate.

Figure 6:
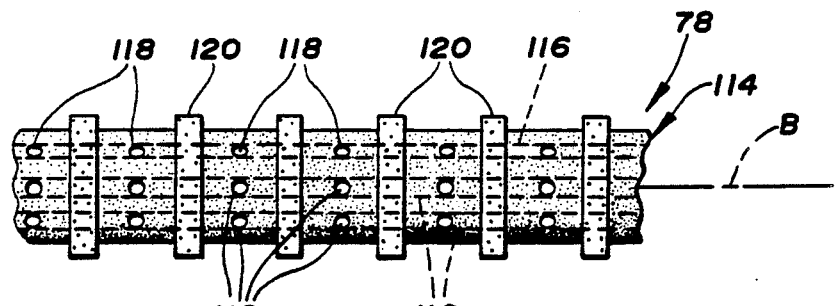
FIG. 6 is a partial view taken along the direction of line 6—6 in FIG. 5 to further illustrate the feeder by showing a feed member which is embodied by a feed roller.

In the preferred construction illustrated by FIGS. 5 and 6, the feed member 78 is embodied by a feed roller 114 that rotates counterclockwise as illustrated in FIG. 5 to grip and move the lowermost label 72 of the feed stack 74 under the gate 104 to the conveyor 80. The feed roller 114 is rotatively driven about an axis B by any suitable drive in a counterclockwise direction and has circumferentially spaced longitudinal passages 116 that communicate with the manifold 91 shown in FIG. 5 during such rotation upon reaching the upper extremity of rotation. Radial passages 118 are spaced longitudinally along each longitudinal passage 116 and extend outwardly to communicate both the pressurized gas and the vacuum supplied through the manifold 91 with the outer extremity of the roller so as to alternately either supply the pressurized gas to the label feed stack 74 or pull the lowermost label 72 downwardly for passage under the gate 104 to the conveyor 80. Annular gripping members 120 of the feed roller 114 are spaced along its length between the radial passages 118. These gripping members may be made of a suitable rubber-like material that provides frictional gripping of the labels during driving thereof under the gate 104 by the rotational movement of the feed roller 114.

As shown in FIG. 5, the feeder 76 also includes a sensor 122 having a sensing member 124 that detects the level of labels 72 in the feed stack 74. Sensor 122 operates to maintain the feed stack 74 at a sufficient height so that there are always labels for the feed roller 114 to supply to the conveyor 80 while not having too high a height so that the pressurized gas from the supply 90 through the manifold 91 cannot maintain the labels of the feed stack separated so that only one label is conveniently moved under the gate 104 as the feed roller is rotatively driven. Thus, the sensor 122 shown in FIG. 5 operates the transfer device 98 to transfer labels from the storage stack 96 to the feed stack 74 to maintain the feed stack at the appropriate height, which normally is about 50 to 100 labels when labels 2 to 5 mils thick are used.

Figure 8:
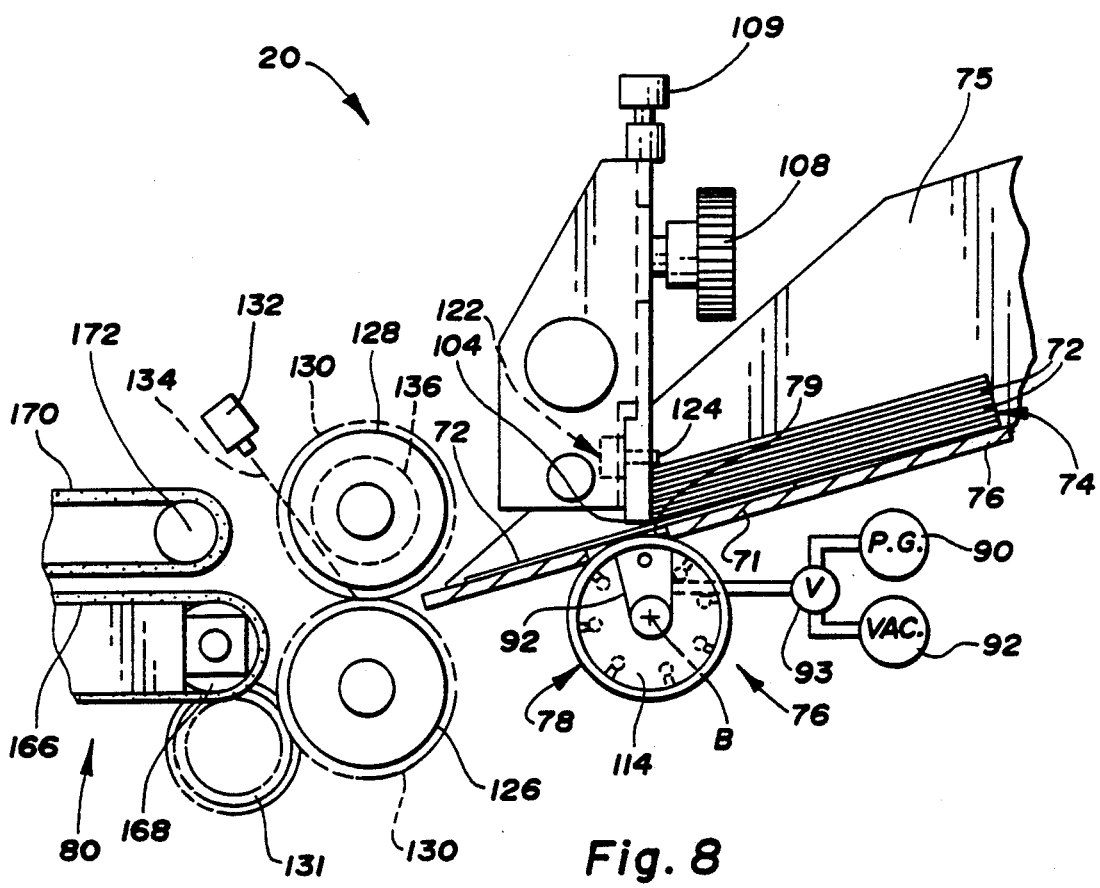
FIG. 8 is a view similar to FIG. 5 but illustrating the feeder with a label partially fed therethrough to the conveyor.

As illustrated in FIGS. 5 and 8, the feeder 76 feeds each label 72 to a pair of lower and upper transfer rollers 126 and 128 which include annular gripping members 130 that are spaced longitudinally and engaged with each other so as to grip a label 72 received therebetween. A drive roller 131 rotatively drives the lower transfer roller 126 counterclockwise which in turn rotatively drives the upper transfer roller 128 clockwise to thereby move labels 72 between the transfer rollers to the conveyor 80. Adjacent the upper transfer roller 128, a sensor 132 is mounted in a suitable manner and shines a sensing beam 134 between the two transfer rollers through an annular groove 136 in the upper transfer roller. This sensing beam 134 detects each label 72 as the label is passed from the feed stack 74 to between the transfer rollers so as to terminate operation of the vacuum supplied from the source 92 through the valve 93 and manifold 91 to the feed roller 114. Thus, when the label is sensed by the beam 134 of sensor 132, the valve 93 is operated to terminate the vacuum and again supply pressurized gas to the feed stack through the manifold 91 as previously mentioned. However, the pressurized gas to the sides of the feed stack 74 is constant and is thus not terminated when the pressurized gas is terminated for application of the vacuum at the feed roller 114.

With reference to FIG. 3, on each side of the rotary wheel 32, the adjacent conveyor 80 includes a conveying reach 138 that extends horizontally. More specifically, the conveying reach 138 on the right side has a reach 140 that extends horizontally without any vertical component and also includes an inclined reach 142 that cooperates with the horizontal reach 140 to extend under the drive mechanism 46 previously described. The conveying reach 138 at the left side of the rotary wheel 32 has an inclined orientation of a constant inclination. Adjustable supports 141 shown in FIGS. 1 and 2 are located at the inner ends of the conveyors 80 to permit adjustment of the inclination of the conveyor reaches 138.

The label supply system 20 as illustrated in FIGS. 2 and 3 includes a pair of transfer members 144 respectively associated with the pair of conveyors 80. Each of the conveyors 80 conveys the label 72 to the associated transfer member 144 for transfer by the label dispenser 82 shown in FIG. 2 to the mold of the blow molding machine as previously described. Each transfer member 144 as illustrated in FIGS. 10 through 12 comprises a vertically extending plate 146 having a lower catcher 148 that receives and positions the lower extremity of the label 72 upon transfer thereto from the conveyor 80. As specifically shown in FIG. 12, the lower catcher 148 includes a pair of inclined portions 150 having a corner junction 152 with each other. The transfer member 144 includes perforations 154 to facilitate transferring of the label by the label dispenser to the mold by permitting the vacuum label carriers 86 shown by phantom line representation in FIG. 12 to pull the label away from the plate without being inhibited by a vacuum formed between the label and the plate 146. A sensor 156 mounted on the upper end of the transfer member plate 146 includes a sensing member 158 that senses whether a label has been received and thereby permits the label supply system to be controlled to halt the blow molding operation or terminated the label supply at both sides of the machine when there is a misfeed or lack of label feed for the in-mold labeling operation at either side of the machine.

As illustrated in FIGS. 10 and 11, the end of the conveyor 80 adjacent the transfer member 144 includes a label diverter 160 having balls or rollers 162 that direct the upstream end of the label so as to turn downwardly toward the transfer member 144 upon passage from the conveyor to the transfer member. An upper label positioner 164 extends downwardly from the diverter 160 and engages the upper extremity of the label 72 as shown in FIGS. 11 and 12 to maintain the label in position prior to transferring therefrom by the label dispenser as previously described.

Figure 9:
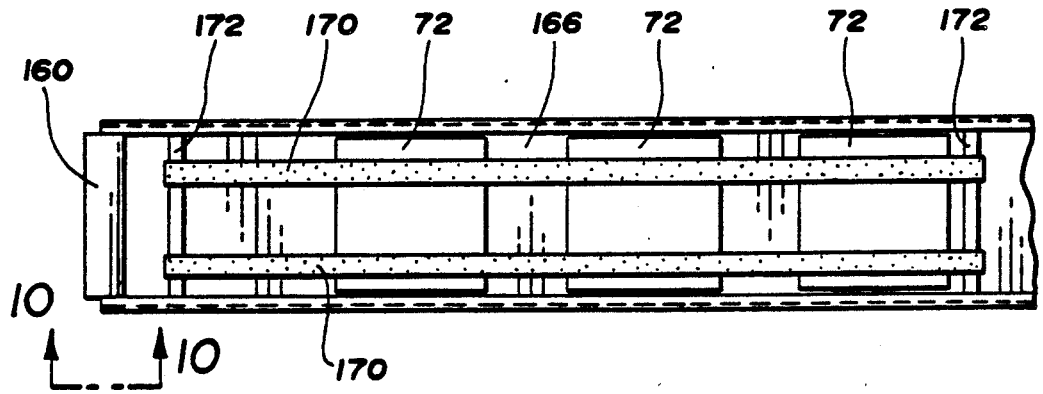
FIG. 9 is a top plan view taken along the direction of line 9—9 in FIG. 3 to further illustrate the conveyor.

As shown in FIGS. 3, 4, 5 and each conveyor includes a lower endless conveying member 166 trained over a pair of rollers 168 one of which is driven to move the conveying member and provide the label conveyance in the appropriate direction. Each conveyor 80 also includes at least one and preferably a pair of endless positioning members 170 that are trained over associated rollers 172 and spaced laterally from each other as shown in FIG. 9. Each label 72 is conveyed below each positioning member 170 so as to be positioned thereby in cooperation with the lower conveying member 166. It is also possible to utilize captured balls that engage and roll over the belt 166 to hold the labels 72 against the conveyor during conveyance. These balls can be captured between two apertured plates which are spaced from each other above the conveyor with the balls received within aligned apertures of the plates.

While the best mode for carrying out the invention has been described in detail, those familiar with the art to which this invention relates will recognize various alternative designs and embodiments for carrying out the invention as defined by the following claims.

What is claimed is:

1. An in-mold label supply system for a plastic blow molding machine including at least one mold having a pair of mold portions which have associated cavity sections and are movable toward and away from each other between an open position where the mold portions are spaced from each other and a closed position where the cavity sections define an enclosed cavity in which the blow molding is performed, the supply system comprising:
    a hopper assembly including a feed hopper for positioning discrete sheet-like labels in a vertical feed stack, the hopper assembly also including a storage hopper for storing a supply of the discrete sheet-like labels in a vertical storage stack, and the hopper assembly including a transfer device that transfers labels from the bottom of the vertical storage stack to the top of the feed stack;
    a feeder including a feed roller that selectively grips the lowermost label of the feed stack to provide delivery thereof from the feed stack with the next higher label remaining in the feed stack, and the feeder also including a gate that is spaced from the feed roller a distance just greater than the label thickness so as to permit only the lowermost label to be moved from the feed stack by the feed roller;
    a source of vacuum and valve means for selectively drawing a vacuum at the feed roller to provide gripping of the lowermost label of the feed stack by the feed roller for movement of the gripped label under the gate and for thereafter terminating the vacuum at the feed roller;
    a conveyor for conveying the label from the feed roller to the blow molding machine; and
    a label dispenser that transfers the label from the conveyor to the mold for placement within the cavity section of one mold portion with the mold portions in the open position to provide in-mold labeling prior to closing of the mold portions for blow molding that secures the label to the blow molded product.

2. An in-mold label supply system for a plastic blow molding machine as in claim 1 further including a pressurized gas supply that supplies pressurized gas to the feed stack of labels to facilitate the gripping of the lowermost label by the feed roller for the delivery from the feed stack with the next higher label remaining in the feed stack.

3. An in-mold label supply system for a plastic blow molding machine as in claim 1 wherein the transfer device includes an endless belt that moves the labels from the bottom of the storage stack to the top of the feed stack.

4. An in-mold label supply system for a plastic blow molding machine as in claim 1 wherein the feeder also includes an adjuster for adjusting the spacing between the gate and the feed roller to accommodate labels of different thicknesses.

5. An in-mold label supply system for a plastic blow molding machine as in claim 1 further including a pressurized gas supply, and the valve means selectively and alternately communicating the feed roller with: (a) the pressurized gas supply which prevents the lowermost label of the feed stack from passing under the gate; or (b) the source of vacuum which grips the lowermost label of the feed stack to actuate movement thereof under the gate by rotation of the feed roller.

6. An in-mold label supply system for a plastic blow molding machine as in claim 5 further including a sensor for sensing movement of a label under the gate to control operation of the valve means.

7. An in-mold label supply system for a plastic blow molding machine as in claim 1 wherein the conveyor includes a conveying reach that extends horizontally and also includes a transfer member to which the label is conveyed for transfer by the label dispenser to the mold of the blow molding machine.

8. An in-mold label supply system for a plastic blow molding machine as in claim 7 wherein the transfer member comprises a vertically extending plate having a lower catcher that receives and positions the lower extremity of the label.

9. A label supply system for a plastic blow molding machine as in claim 8 wherein the lower catcher includes a pair of inclined portions having a corner junction with each other.

10. An in-mold label supply system for a plastic blow molding machine as in claim 8 wherein the transfer member is perforated to facilitate transferring of the label by the label dispenser to the mold.

11. An in-mold label supply system for a plastic blow molding machine as in claim 8 further including a sensor for sensing whether a label is positioned on the transfer member.

12. An in-mold label supply system for a plastic blow molding machine including at least one mold having a pair of mold portions which have associated cavity sections and are movable toward and away from each other between an open position where the mold portions are spaced from each other and a closed position where the cavity sections define an enclosed cavity in which the blow molding is performed, the supply system comprising:

a hopper assembly including a feed hopper for positioning discrete sheet-like labels in a vertical feed stack, the hopper assembly also including a storage hopper for storing a supply of the discrete sheet-like labels in a vertical storage stack, and the hopper assembly including a transfer device that transfers labels from the bottom of the vertical storage stack to the top of the feed stack;

a feeder including a feed roller that selectively grips the lowermost label of the feed stack to provide delivery thereof from the feed stack with the next higher label remaining in the feed stack, and the feeder also including a gate that is spaced from the feed roller a distance just greater than the label thickness so as to permit only the lowermost label to be moved from the feed stack by the feed member under the gate;

a pressurized gas supply, a source of vacuum, and valve means for selectively and alternately communicating the feed roller with either (a) the pressurized gas supply which prevents the lowermost label of the feed stack from passing under the gate or (b) the source of vacuum which grips the lowermost label of the fed stack to provide movement thereof under the gate;

a conveyor for conveying the label from the feed member to the blow molding machine; and a label dispenser that transfers the label from the conveyor to the mold for placement within the cavity section of one mold portion with the mold portions in the open position to provide in-mold labeling prior to closing of the mold portions for blow molding that secures the label to the blow molded product.

13. An in-mold label supply system for a rotary plastic blow molding machine including a rotary wheel having a plurality of molds each of which has a pair of mold portions which have associated cavity sections and are movable toward and away from each other between an open position where the mold portions are spaced from each other and a closed position where the cavity sections define an enclosed cavity in which the blow molding is performed, the supply system comprising:

a hopper assembly including a feed hopper for positioning discrete sheet-like labels in a vertical feed stack, the hopper assembly also including a storage hopper for storing a supply of the discrete sheet-like labels in a vertical storage stack, and the hopper assembly including a transfer device that transfers labels from the bottom of the vertical storage stack to the top of the feed stack;

a feeder including a feed roller that selectively grips the lowermost label of the feed stack to provide delivery thereof from the feed stack with the next higher label remaining in the feed stack, and the feeder also including a gate that is spaced from the feed roller a distance just greater than the label thickness so as to permit only the lowermost label to be moved from the feed stack by the feed roller;

a source of vacuum and valve means for selectively drawing a vacuum at the feed roller to provide gripping of the lowermost label of the feed stack by the feed roller for movement of the gripped label under the gate and for thereafter terminating the vacuum at the feed roller;

a conveyor for conveying the label from the feed roller to the blow molding machine; and a label dispenser that transfers the label from the conveyor to the mold for placement within the cavity section of one mold portion with the mold portions in the open position to provide in-mold labeling prior to closing of the mold portions for blow molding that secures the label to the blow molded product.

14. An in-mold label supply system for a plastic blow molding machine including a rotary wheel having plurality of molds each of which has a pair of mold portions which have associated cavity sections and are movable toward and away from each other between an open position where the mold portions are spaced from each other and a closed position where the cavity sections define an enclosed cavity in which the blow molding is performed, the supply system comprising:

a hopper assembly including a feed hopper for positioning discrete sheet-like labels in a vertical feed stack, the hopper assembly also including a storage hopper for storing a supply of the discrete sheet-like labels in a vertical storage stack, and the hopper assembly including a transfer device that transfers labels from the bottom of the vertical storage stack to the top of the feed stack;

a feeder including a feed roller that is rotated to selectively grip the lowermost label of the feed stack to provide delivery thereof from the feed stack with the next higher label remaining in the feed stack, and the feeder also including a gate that is spaced from the feed roller a distance just greater than the label thickness so as to permit only the lowermost label to be moved from the feed stack under the gate by the feed roller;

a pressurized gas supply, a source of vacuum, and valve means for selectively and alternately communicating the feed roller with either (a) the pressurized gas supply which prevents the lowermost label of the feed stack from passing under the gate or (b) the source of vacuum which grips the lowermost label of the feed stack to actuate movement thereof under the gate by rotation of the feed roller;

a conveyor for conveying the label from the feed roller to the blow molding machine; and a label dispenser that transfers the label from the conveyor to one of the molds for placement within the cavity section of one mold portion thereof with the mold portions in the open position to provide in-mold labeling prior to closing of the mold portions for blow molding that secures the label to the blow molded product.

15. An in-mold label supply system for a plastic blow molding machine including a rotary wheel having a plurality of molds each of which has a pair of mold portions which have associated cavity sections and are movable toward and away from each other between an open position where the mold portions are spaced from each other and a closed position where the cavity sections define an enclosed cavity in which the blow molding is performed, the supply system comprising:

a hopper assembly including a feed hopper for positioning discrete sheet-like labels in a vertical feed stack, the hopper assembly also including a storage hopper for storing a supply of the discrete sheet-like labels in a vertical storage stack, and the hopper assembly including a transfer device that transfers labels from the bottom of the vertical storage stack to the top of the feed stack;

a feeder including a feed roller that is rotated to selectively grip the lowermost label of the feed stack to provide delivery thereof from the feed stack with the next higher label remaining in the feed stack, the feeder also including a gate having a lower edge that is spaced from the feed roller a distance just greater than the label thickness so as to permit only the lowermost label to be moved from the feed stack under the gate by the feed roller, an adjuster that adjusts the spacing between the lower edge of the gate and the feed roller, and a sensor that senses movement of a label under the gate;

a pressurized gas supply, a source of vacuum, and valve means operated by the sensor to selectively and alternately communicate the feed roller with either (a) the pressurized gas supply which prevents the lowermost label of the feed stack from passing under the gate or (b) the source of vacuum which grips the lowermost label of the feed stack to actuate movement thereof under the gate by rotation of the feed roller;

a conveyor for conveying the label from the feed roller to the blow molding machine, and the conveyor having a transfer member that receives the label adjacent the blow molding machine; and a label dispenser that transfers the label from the transfer member of the conveyor to one of the molds for placement within the cavity section of one mold portion thereof with the mold portions in the open position to provide in-mold labeling prior to closing of the mold portions for blow molding that secures the label to the blow molded product.

16. An in-mold label supply system for a plastic blow molding machine including a rotary wheel having a plurality of molds each of which has a pair of mold portions which have associated cavity sections and are movable toward and away from each other between an open position where the mold portions are spaced from each other and a closed position where the cavity sections define an enclosed cavity in which the blow molding is performed, the supply system comprising:

a pair of hopper assemblies each of which includes a feed hopper for positioning discrete sheet-like labels in a vertical feed stack, each hopper assembly also including a storage hopper for storing a supply of the discrete sheet-like labels in a vertical storage stack, and each hopper assembly including a transfer device that transfers labels from the bottom of the vertical storage stack to the top of the feed stack;

a pair of feeders each of which includes a feed roller that is rotated to selectively grip the lowermost label of the associated feed stack to provide delivery thereof from the feed stack with the next higher label remaining in the feed stack, and each feeder also including a gate that is spaced from the associated feed roller a distance just greater than the label thickness so as to permit only the lowermost label to be moved from the associated feed stack under the gate by the feed roller thereof;

a pressurized gas supply, a source of vacuum, and valve means for selectively and alternately communicating the feed roller of each feeder with either (a) the pressurized gas supply which prevents the lowermost label of the feed stack from passing under the gate or (b) the source of vacuum which grips the lowermost label of the feed stack to actuate movement thereof under the gate by rotation of the feed roller;

a pair of conveyors for respectively conveying the labels from the transfer members of the feed rollers to the blow molding machine, nd each conveyor having a transfer member that receives the label from the associated feed roller; and a label dispenser that transfers the labels from the transfer members of the conveyors to one of the molds for placement within the cavity sections of both mold portions thereof with the old portions in the open position to provide in-mold labeling prior to closing of the mold portions for blow molding that secures the label to the blow molded product.

* * * * *

UNITED STATES PATENT AND TRADEMARK OFFICE
CERTIFICATE OF CORRECTION

PATENT NO. : 5,067,890
DATED : November 26, 1991
INVENTOR(S) : Richard L. Dunlap et al It is certified that error appears in the above-identified patent and that said Letters Patent is hereby corrected as shown below:

Column 11, line 18 after "and" and before "each" insert --8,--;

Column 13, line 30, claim 12
page 4, line 14, claim 16), "fed" should be --feed--;

Column 14, lines 15-16, claim 14 after "having" and before "plurality" insert --a--;

Column 16, line 34, claim 16
claim 20), "nd" should be --and--;

Column 16, line 40, claim 16
claim 20), "old" should be --mold--.

Signed and Sealed this

Twenty-third Day of March, 1993

*Attest:*

STEPHEN G. KUNIN

*Attesting Officer*  Acting Commissioner of Patents and Trademarks